(12) United States Patent
Borkar et al.

(10) Patent No.: US 9,843,561 B2
(45) Date of Patent: Dec. 12, 2017

(54) MITM PROXY HAVING CLIENT AUTHENTICATION SUPPORT

(71) Applicant: Avaya Inc., Santa Clara, CA (US)

(72) Inventors: Vijaykumar V. Borkar, Pune (IN); Saurabh Sule, Pune (IN)

(73) Assignee: Avaya Inc., Santa Clara, CA (US)

( * ) Notice: Subject to any disclaimer, the term of this patent is extended or adjusted under 35 U.S.C. 154(b) by 99 days.

(21) Appl. No.: 14/884,690

(22) Filed: Oct. 15, 2015

(65) Prior Publication Data

US 2017/0111323 A1 Apr. 20, 2017

(51) Int. Cl.
*G06F 9/00* (2006.01)
*H04L 29/06* (2006.01)
*H04L 9/32* (2006.01)
*H04L 9/08* (2006.01)

(52) U.S. Cl.
CPC ........ *H04L 63/0281* (2013.01); *H04L 9/0897* (2013.01); *H04L 9/321* (2013.01); *H04L 9/3263* (2013.01); *H04L 63/0823* (2013.01); *H04L 63/168* (2013.01)

(58) Field of Classification Search
CPC .... H04L 63/0281; H04L 9/3263; H04L 9/321
See application file for complete search history.

(56) References Cited

U.S. PATENT DOCUMENTS

| 2007/0083749 | A1* | 4/2007 | Fang | H04L 12/58 713/152 |
| 2013/0191630 | A1 | 7/2013 | Ylonen et al. | |
| 2013/0191631 | A1 | 7/2013 | Ylonen et al. | |
| 2014/0095865 | A1* | 4/2014 | Yerra | H04L 9/3265 713/156 |
| 2014/0191627 | A1 | 7/2014 | Takahashi et al. | |
| 2014/0365775 | A1* | 12/2014 | Yavuz | H04L 63/061 713/171 |
| 2015/0186668 | A1* | 7/2015 | Whaley | G06F 21/6218 713/156 |

* cited by examiner

*Primary Examiner* — Teshome Hailu (57) ABSTRACT

Methods, systems and computer readable media for a MiTM proxy that supports client authentication are described.

20 Claims, 6 Drawing Sheets

MITM PROXY HAVING CLIENT AUTHENTICATION SUPPORT

TECHNICAL FIELD

Embodiments relate generally to computer networks, and more particularly, to methods, systems and computer readable media for a man-in-the-middle (MiTM) proxy having client authentication support capabilities.

BACKGROUND

There have been MiTM proxies developed for protocols such as secure shell (SSH) and secure sockets layer/transport layer security (SSL/TLS). Some of these MiTM proxies have been implemented in various network devices including internet facing firewalls.

Some conventional MiTM proxies that support SSL/TLS may lack the functionality to support client authentication. For example, if there is a proxy in between the SSL/TLS client and the server, and the server has been configured to require the client to authenticate itself as part of the SSL/TLS handshake, a conventional MiTM proxy may not be able to accommodate the client authentication.

Embodiments were conceived in light of the above mentioned needs, problems and/or limitations, among other things.

SUMMARY

One or more embodiments can include methods, systems and computer readable media for a MiTM proxy having client authentication support. A method can include receiving, at a man-in-the-middle (MiTM) proxy, a client certificate request from a server during a communication session in a communication protocol, and intercepting, at the MiTM proxy, the client certificate request. The method can also include forwarding, from the MiTM proxy, the client certificate request to a client, and intercepting, at the MiTM proxy, a first set of response messages generated by the client in response to the client certificate request.

The method can further include generating, at the MiTM proxy, a second set of response messages configured to be sent to the server on behalf of the client in response to the client certificate request message, the second set of response messages containing a public certificate mapped to the client that was obtained by the MiTM proxy, the public certificate being managed by a third party system, and a certificate verify message generated by the MiTM proxy and signed using a private key maintained by the third party system. The method can also include sending, from the MiTM proxy to the server, the second set of response messages configured to authenticate the client to the server through the MiTM proxy.

In some implementations, the communication protocol includes a secure socket layer/transport layer security (SSL/TLS) protocol. The third party system can include a hardware security module (HSM), and the method can further include obtaining the public certificate and the private key from the HSM.

In some implementations, the third party system can include a lightweight directory access protocol (LDAP) system, and the method can further include obtaining the public certificate and the private key from the LDAP system. In other implementations, the third party system can include a Windows Active Directory system, and the method can further include obtaining the public certificate and the private key from the Windows Active Directory system.

In some implementations, the third party system can include a database, and the method can further include obtaining the public certificate and the private key from the database.

In some implementations, the method can also include requesting the public certificate mapped to the client from a hardware security module (HSM), and adding the public certificate received from the HSM to the second set of response messages. The method can further include requesting a hardware security module (HSM) to sign the certificate verify message for the MiTM proxy, and sending the second set of response messages, including the certificate verify message signed by the HSM, to the server.

Some implementations can include a system comprising one or more processors configured to perform operations. The operations can include receiving, at a man-in-the-middle (MiTM) proxy, a client certificate request from a server during a communication session in a communication protocol, and intercepting, at the MiTM proxy, the client certificate request.

The operations can also include forwarding, from the MiTM proxy, the client certificate request to a client, and intercepting, at the MiTM proxy, a first set of response messages generated by the client in response to the client certificate request. The operations can further include generating, at the MiTM proxy, a second set of response messages configured to be sent to the server on behalf of the client in response to the client certificate request message, the second set of response messages containing a public certificate mapped to the client that was obtained by the MiTM proxy, the public certificate being managed by a third party system, and a certificate verify message generated by the MiTM proxy and signed using a private key maintained by the third party system. The operations can also include sending, from the MiTM proxy to the server, the second set of response messages configured to authenticate the client to the server through the MiTM proxy.

In some implementations, the communication protocol can include a secure socket layer/transport layer security (SSL/TLS) protocol. The third party system can include a hardware security module (HSM), and the operations can further include obtaining the public certificate and the private key from the HSM.

In some implementations, the third party system can include a lightweight directory access protocol (LDAP) system, and the operations can further include obtaining the public certificate and the private key from the LDAP system.

In some implementations, the third party system can include a Windows Active Directory system, and wherein the operations further include obtaining the public certificate and the private key from the Windows Active Directory system. In other implementations, the third party system can include a database, and the operations can further include obtaining the public certificate and the private key from the database.

The operations can also include requesting the public certificate mapped to the client from a hardware security module (HSM), and adding the public certificate received from the HSM to the second set of response messages. The operations can further include requesting a hardware security module (HSM) to sign the certificate verify message for the MiTM proxy, and sending the second set of response messages, including the certificate verify message signed by the HSM, to the server.

Some implementations can include a nontransitory computer readable medium having stored thereon software instructions that, when executed by one or more processors, cause the one or more processors to perform operations. The operations can include receiving, at a man-in-the-middle (MiTM) proxy, a client certificate request from a server during a communication session in a communication protocol, and intercepting, at the MiTM proxy, the client certificate request.

The operations can also include forwarding, from the MiTM proxy, the client certificate request to a client, and intercepting, at the MiTM proxy, a first set of response messages generated by the client in response to the client certificate request. The operations can further include generating, at the MiTM proxy, a second set of response messages configured to be sent to the server on behalf of the client in response to the client certificate request message, the second set of response messages containing a public certificate mapped to the client that was obtained by the MiTM proxy, the public certificate being managed by a third party system, and a certificate verify message generated by the MiTM proxy and signed using a private key maintained by the third party system. The operations can also include sending, from the MiTM proxy to the server, the second set of response messages configured to authenticate the client to the server through the MiTM proxy.

In some implementations, the communication protocol can include a secure socket layer/transport layer security (SSL/TLS) protocol. The third party system can include a hardware security module (HSM), and the operations can further include obtaining the public certificate and the private key from the HSM.

In some implementations, the third party system can include a lightweight directory access protocol (LDAP) system, and the operations can further include obtaining the public certificate and the private key from the LDAP system.

In some implementations, the third party system can include a Windows Active Directory system, and wherein the operations further include obtaining the public certificate and the private key from the Windows Active Directory system. In other implementations, the third party system can include a database, and the operations can further include obtaining the public certificate and the private key from the database.

The operations can also include requesting the public certificate mapped to the client from a hardware security module (HSM), and adding the public certificate received from the HSM to the second set of response messages. The operations can further include requesting a hardware security module (HSM) to sign the certificate verify message for the MiTM proxy, and sending the second set of response messages, including the certificate verify message signed by the HSM, to the server.

DETAILED DESCRIPTION

In general, a typical SSL/TLS protocol consists of two parts: 1) a handshake protocol and 2) a record protocol. The handshake protocol may authenticate the server and setup the keys for subsequent communications. The record protocol can be used to transfer encrypted data.

Additionally, the handshake protocol may require a client to authenticate itself to the server. This authentication is based on the client providing its own security certificate (e.g., an X.509 public certificate) and proving that it is in possession of the corresponding private key by signing a message.

In some implementations, the client authentication process would be performed by a MiTM proxy with client authentication support on behalf of the client and a record would be maintained of the same e.g., for audit purposes. Whenever the MiTM proxy receives a client authentication request from the server, the MiTM proxy can intercept the request, respond as the client to the server and acting as a server send a client authentication request to the client. The client can then provide its public certificate (e.g., X.509) and sign the request. This response will be processed by the MiTM proxy. The MiTM proxy generates another client authentication message, obtains a public certificate and sends the client authentication message to the server. The message may contain a different public certificate (e.g., an X.509 public certificate being managed by a third party software system that is mapped to the requesting client). The proxy will also sign the message using the corresponding private key being maintained by the third party system.

In some implementations, the MiTM proxy with client authentication support can contact a hardware security module (HSM) to get access to the corresponding private key so that the MiTM proxy can sign the message. In other implementations, the HSM can be replaced by a system like a lightweight directory access protocol (LDAP) system, Windows Active Directory or a Database.

In some implementations, the MiTM proxy may not actually need access to the private key. The MiTM proxy may request that the HSM (or LDAP system, Windows Active Directory System or Database) sign the message for the MiTM proxy and the MiTM proxy can then send the signed message to the server. The MiTM proxy may also request the mapped public certificate from the HSM.

Figure 1:
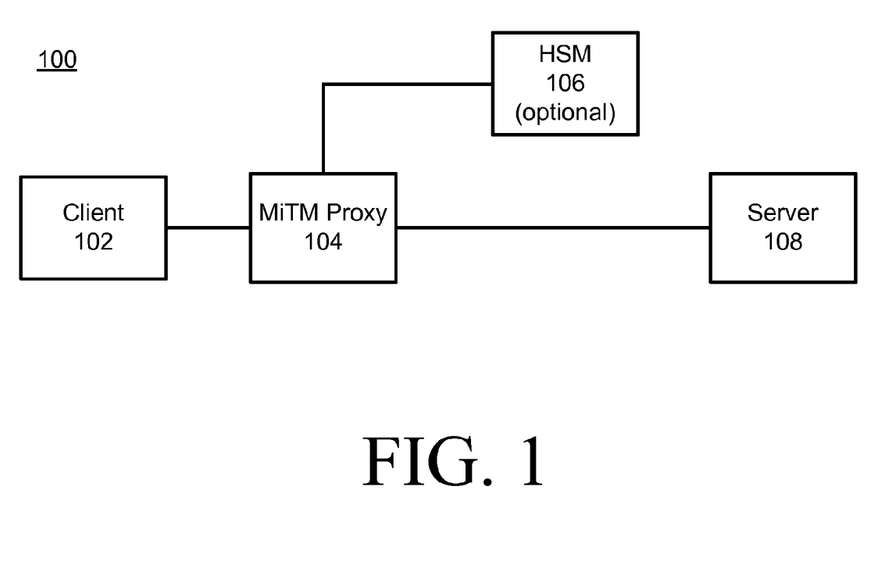
FIG. 1 is a diagram of an example client/server environment in accordance with at least one implementation.

As shown in FIG. 1, an example network environment 100 includes a client 102, a MiTM proxy 104, an optional HSM 106, and a server 108, which can all be linked by a wired network, a wireless network, or a combination of the two. Client 102 is configured to communicate with Server 108 through MiTM proxy 104.

Figure 2:
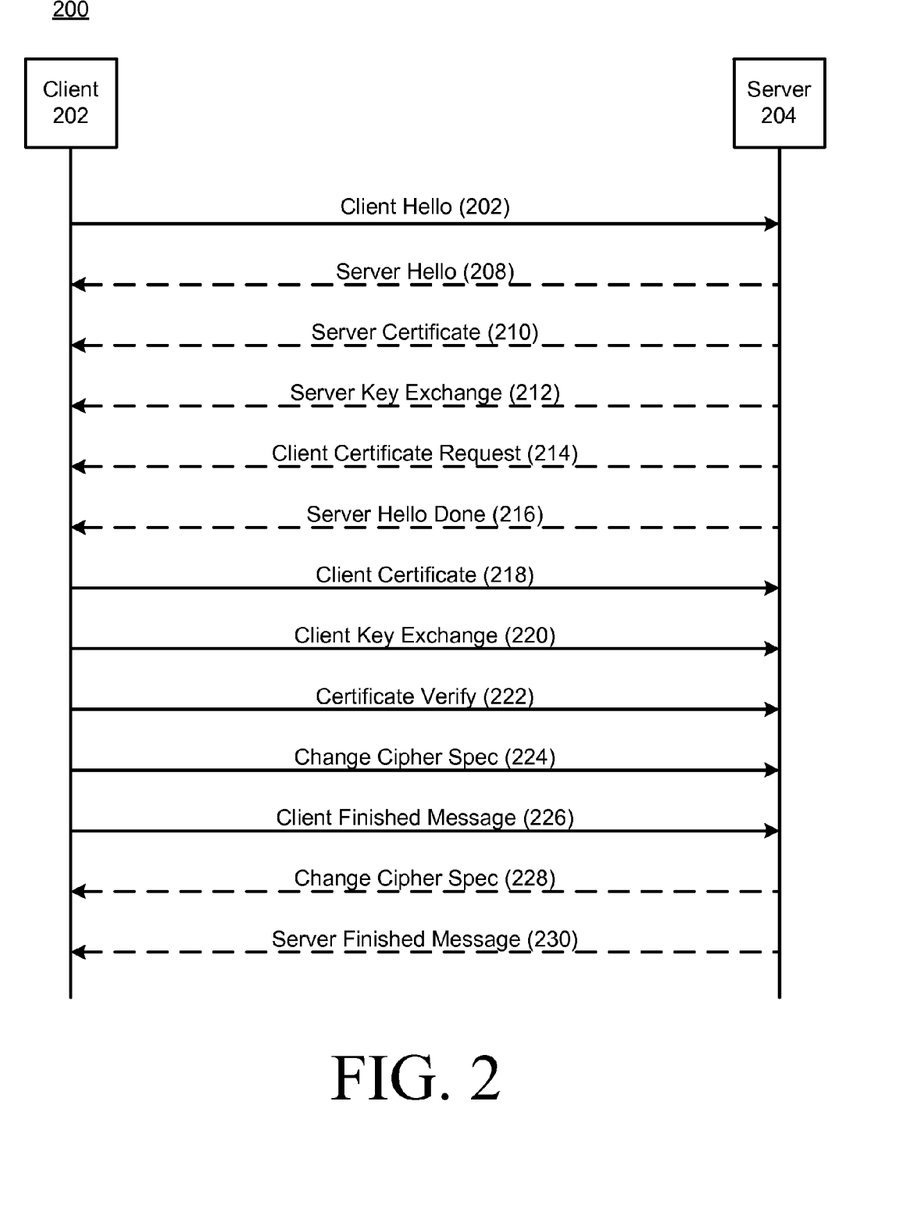
FIG. 2 is a protocol diagram showing a standard client authentication with SSL.

FIG. 2 is a flow chart of a standard client authentication with SSL process 200. The client authentication shown in FIG. 2 is feasible because there is no MiTM proxy disposed between the client 202 and the server 204. Processing begins at 206, where a client 202 sends a client hello message to a server 204.

At 208, the server 204 responds with a server hello message.

At 210, the server 204 sends a certificate to the client 202.

At 212, the server 204 sends a key exchange message to the client 202.

At 214, the server 204 sends a client certificate request message.

At 216, the server 204 sends a server hello done message.

At 218, the client 202 sends a client certificate message to the server 204.

At 220, the client 202 sends a client key exchange message to the server 204.

At 222, the client 202 sends a certificate verify message to the server 204.

At 224, the client 202 sends a change cipher spec message to the server 204.

At 226, the client 202 sends a client finished message to the server 204.

At 228, the server 204 sends a change cipher spec message to the client 202.

At 230, the server 204 sends a server finished message to the client 202.

Figure 3:
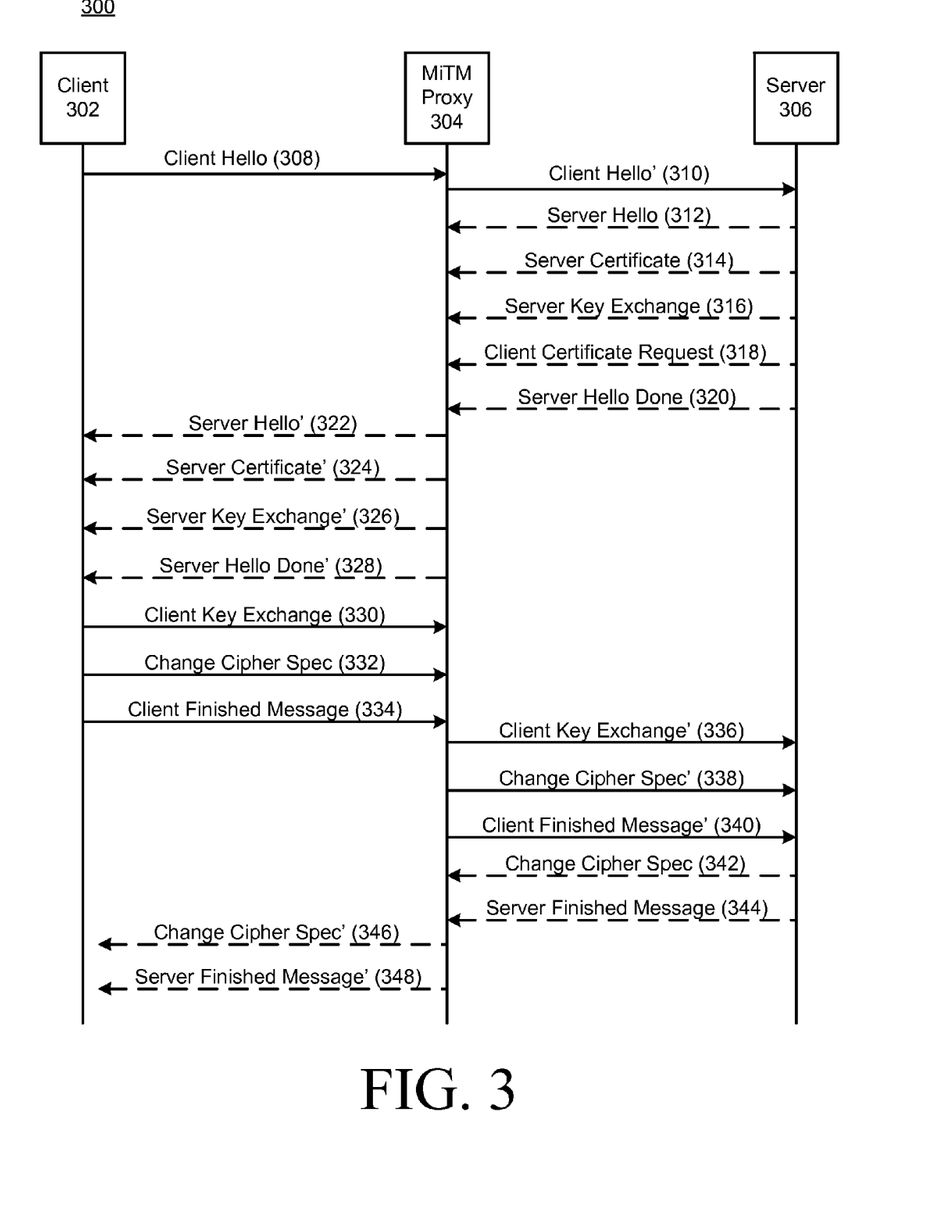
FIG. 3 is a protocol drawing showing a standard SSL communication with a MiTM proxy with no support for client authentication.

FIG. 3 is a flow chart of a standard SSL communication process 300 with a MiTM proxy with no support for client authentication. Processing begins at 308, where a client hello message is sent from the client 302 to the MiTM proxy 304.

At 310, the MiTM proxy sends a client hello' message from the MiTM proxy to the server 306. The client hello' message may be the same or different than the client hello message sent from the client 302. For example, some message details may differ such as protocol version from client to proxy and proxy to server. In general, any message between the client and the proxy may be the same as or different than corresponding message exchanged between the proxy and the server.

At 312-320, the server 306 sends to the MiTM proxy 304 the following messages: server hello, server certificate, server key exchange, client certificate request, and server hello done.

At this point, the conventional MiTM proxy 304, which does not include support for client authentication, sends messages to the client 302 that the MiTM proxy 304 received from the server 306, except for the client certificate request message (318). At 322, the MiTM proxy 304 sends a server hello' message. At 324, the MiTM proxy 304 sends a server certificate' message. At 326, the MiTM proxy 304 sends a server key exchange' message. At 328, the MiTM proxy 304 sends a server hello done' message.

The client 302 responds to the received series of messages from the MiTM proxy by sending to the MiTM proxy a client key exchange message at 330, a change cipher spec message at 332, and a client finished message at 334.

The MiTM proxy 304 sends corresponding messages to the server 306 as a client key exchange' message at 336, a client cipher spec' message at 338, and a client finished message' at 340.

The server 306 responds to the MiTM proxy 304 with a change cipher spec message at 342 and a server finished message at 344.

The MiTM proxy 304, in turn, sends to the client 302 a change cipher spec' message at 346 and a server finished message' at 348.

Figure 4:
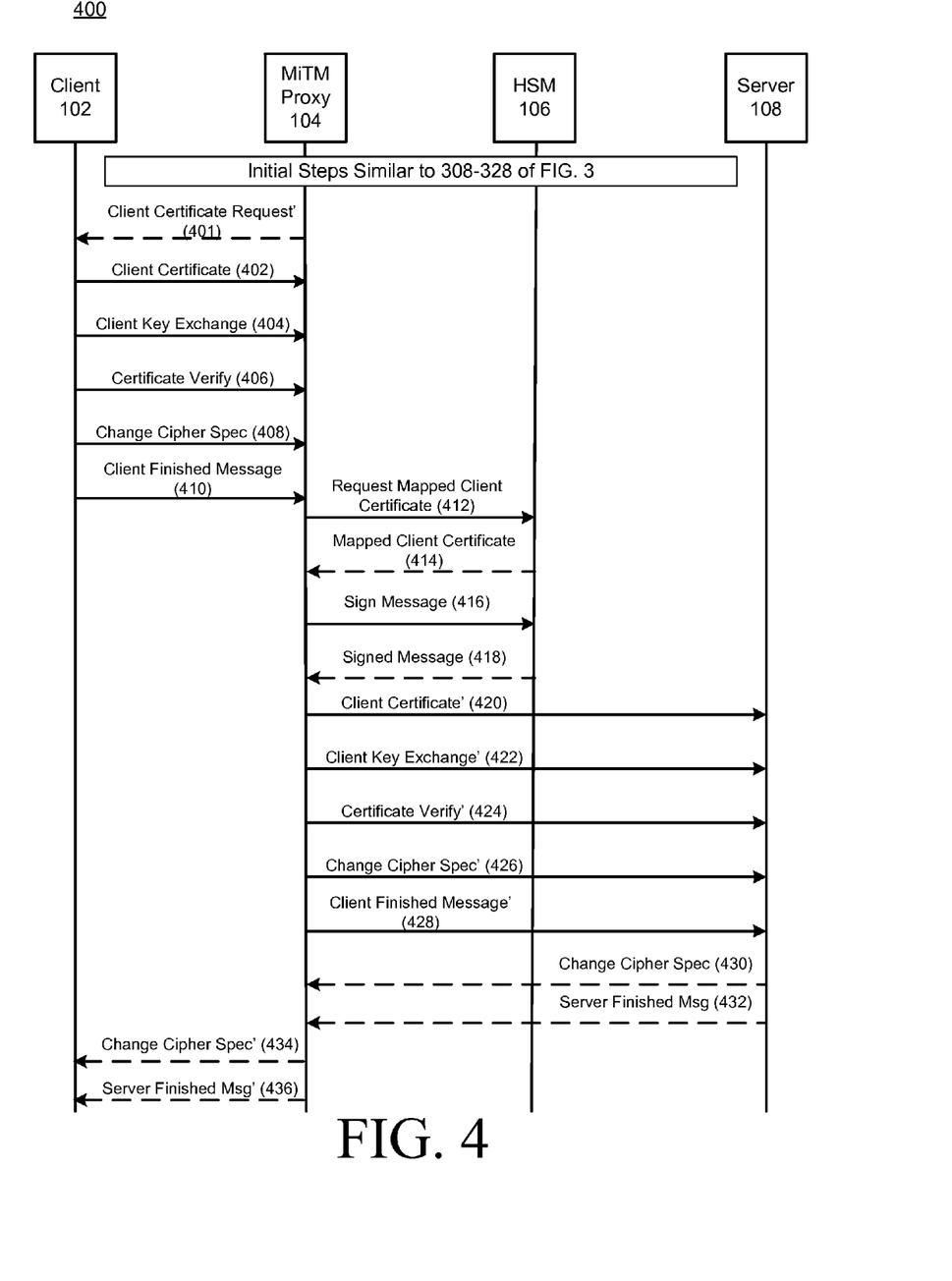
FIG. 4 is a protocol drawing of an example SSL communication with a MiTM proxy having support for client authentication in accordance with at least one implementation.

FIG. 4 is a flow chart of an example SSL communication process with a MiTM proxy having support for client authentication in accordance with at least one implementation. 102-108 shown in FIG. 4 are similar to 102-108 discussed above in connection with FIG. 1. Initial steps have been omitted in FIG. 4 to focus on certain features. The omitted steps can include steps similar to steps 308-328 described above in connection with FIG. 3. However, a key difference between the functions of a standard MiTM proxy shown in FIG. 3 and the MiTM proxy having client authentication support shown in FIG. 4 is that the client certificate request message' sent at 401 in FIG. 4 in response to the client certificate request message received from the server at 318 is not sent in the process shown in FIG. 3 because a standard MiTM proxy (e.g., 304) may not provide support for client authentication.

Processing continues from the initial steps to 401, where a client certificate request' message is sent to the client 102 from the MiTM proxy 104. The client certificate request' message may be sent in response to the MiTM proxy 104 receiving a client certificate request message bound for the client (e.g., the message sent at 318 in FIG. 3).

At 402, a client certificate is sent from the client 102 and intercepted at the MiTM proxy 104. At 404, the client 102 sends a client key exchange message, which is intercepted by the MiTM proxy 104. The MiTM proxy 104 may inspect each packet to determine when there is a client certificate request from a server.

At 406, the client 102 sends a certificate verify message, which is intercepted by the MiTM proxy 104. At 408, the client 102 sends a change cipher spec message and at 410 the client 102 sends a client finished message, both of which are intercepted by the MiTM proxy 104. The messages sent from the client at 402-410 can comprise a first set of response messages to the client certificate request message sent at 102 and based on the client certificate request message sent at 318 in FIG. 3.

At 412, the MiTM proxy 104 requests a client certificate mapped to the client 102 from a third party system such as the HSM 106 (or other source such as a Windows Active Directory system, an LDAP system, or a database). In some implementations, the client certificate may be a public certificate. This certificate may be used by the MiTM proxy 104 to authenticate the client 102 to the server 108.

At 414, the HSM 106 sends a mapped client certificate to the MiTM proxy 104.

At 416, the MiTM proxy 104 requests that a message be signed by the HSM 106 (or other source) using a private key maintained by the HSM 106 (or other third party system). The signed message may be sent from the MiTM proxy 104 to the server 108 as part of the client authentication process supported by the MiTM proxy 104. In some implementations, the HSM 106 (or other third party system) could provide the private key to the MiTM proxy 104 and the MiTM proxy could use the private key to sign the message prior to sending to the server 108.

At 418, the HSM 106 (or other source) provides a signed message to the MiTM proxy 104. In some implementations, the HSM 106 may provide a private key to be used by the MiTM proxy 104 to sign the message, instead of or in addition to a message signed by the HSM 106.

At 420, the MiTM proxy 104 sends to the server 108 a client certificate' message containing the certificate mapped to the client received from the HSM 106 (or other source) at 414.

At 422, the MiTM proxy 104 sends to the server 108 a client key exchange' message.

At 424, the MiTM proxy 104 sends to the server 108 a certificate verify' message, by which the client is authenticated via the MiTM proxy 104 by using the private key to sign (or by receiving the signed message from the HSM 106 or other source, signed using the private key) a hash of messages up to this point in the exchange. The server 108 may verify the signature using the public key of the MiTM proxy 104 which was sent in the client certificate' message at 420. The server may thus ensure that the signed message was signed with the private key obtained by the MiTM proxy 104.

At 426, the MiTM proxy 104 sends a change cipher spec' message to the server 108.

At 428, the MiTM proxy 104 sends a client finished' message to the server 108. The messages sent at 420-428 can comprise a second set of response messages generated by the MiTM proxy 104 and substituted for the intercepted first set of response messages sent by the client at 402-410.

The server 108 responds with a change cipher spec message at 430 and a server finished message at 432.

The MiTM proxy 104 sends to the client 102 a change cipher spec' message at 434 and a server finished' message at 436.

Thus, as described above, an implementation of the MiTM proxy having client authentication support can provide the advantages of the proxy while also supporting client authentication. It will be appreciated that 402-436 may be performed in a different order, repeated in whole or in part or combined in some implementations. For example, 412 and 416 may be combined, and 414 and 418 may also be combined. These may also be performed simultaneously or in any order. Also, 402-410 and 420-428 may be performed simultaneously or in any order. In some implementations. HSM 106 may be implemented on the same hardware as MiTM proxy 104. In some implementations, HSM 106 may be implemented on a different server communicatively coupled to MiTM proxy 104.

Figure 5:
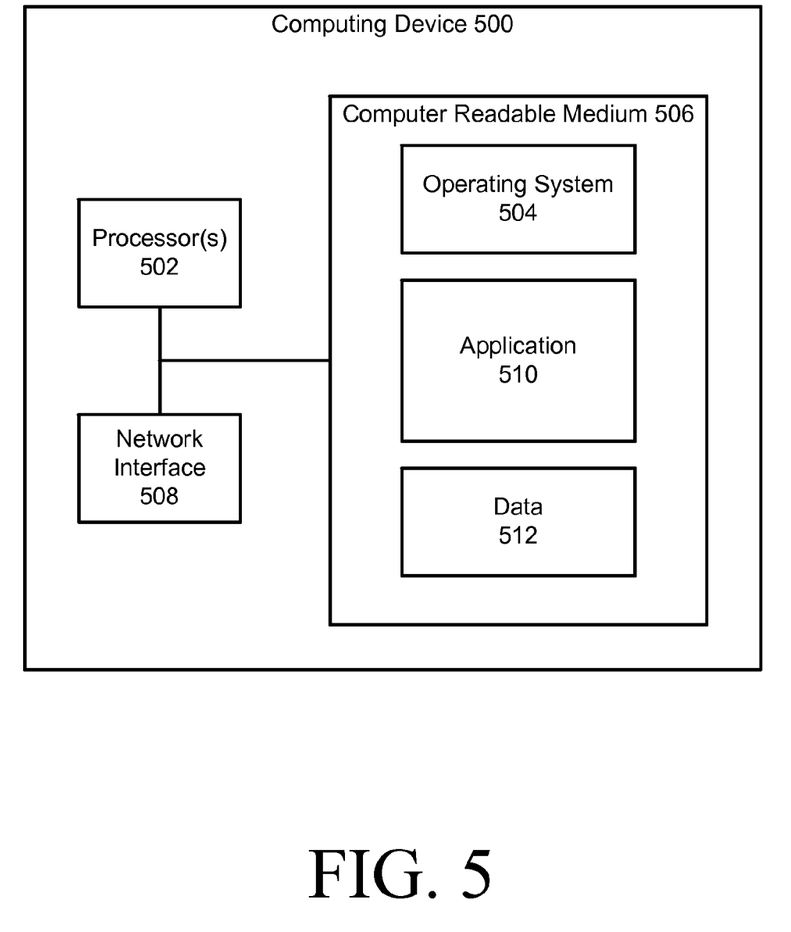
FIG. 5 is a diagram of an example computing device configured for SSL communication with a MiTM proxy having support for client authentication in accordance with at least one implementation.

FIG. 5 is a diagram of an example computing device 500 in accordance with at least one implementation. The computing device 500 includes one or more processors 502, nontransitory computer readable medium 506 and network interface 508. The computer readable medium 506 can include an operating system 504, a dynamic template application 510 and a data section 512 (e.g., for storing MiTM proxy data with client authentication information).

In operation, the processor 502 may execute the application 510 stored in the computer readable medium 506. The application 510 can include software instructions that, when executed by the processor, cause the processor to perform operations for a MiTM proxy having client authentication in accordance with the present disclosure (e.g., performing one or more of 308-328 and/or 402-436 described above).

The application program 510 can operate in conjunction with the data section 512 and the operating system 504.

Figure 6:
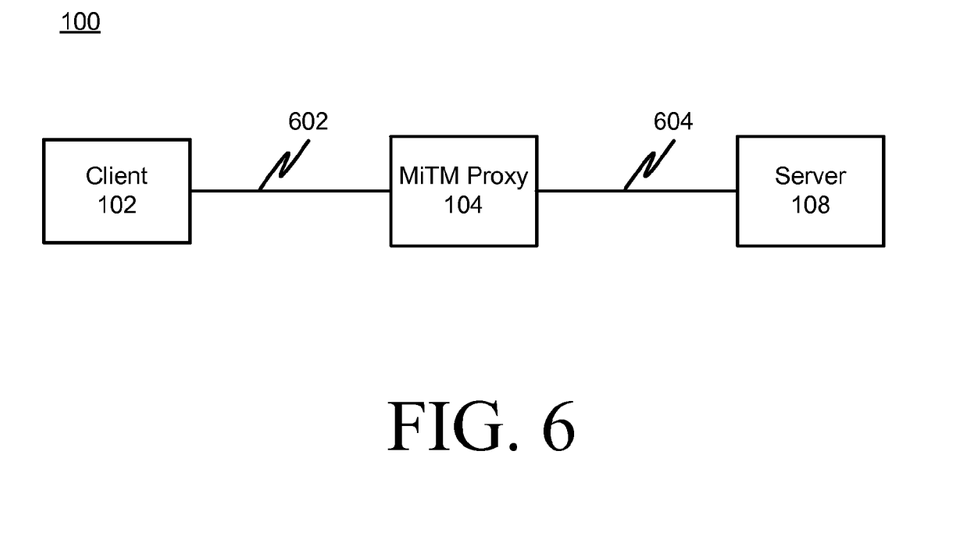
FIG. 6 is a diagram of an example client/server environment with a MiTM proxy having support for client authentication in accordance with at least one implementation.

As shown in FIG. 6, the MiTM proxy maintains a first SSL connection with client authentication 602 between the client 102 and the MiTM proxy 104, and a second SSL connection with client authentication 604 between the MiTM proxy 104 and the server 108. In the first SSL connection with client authentication 602, the MiTM proxy 104 functions as a server to the client 102, and in the second SSL connection with client authentication 604 the MiTM proxy 104 functions as a client to the server 108. SSL messages arrive from the server and are decrypted at the MiTM proxy 104 according to the second SSL connection with client authentication 604. The MiTM proxy 104 then encrypts the messages according to the first SSL connection with client authentication 602 and sends the encrypted messages to the client 102. The reverse of the above process is performed for messages from the client 102 to the server 108.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for a MiTM proxy supporting client authentication.

What is claimed is:

1. A method comprising:
   receiving, at a man-in-the-middle (MiTM) proxy, a first client certificate request from a server during a communication session that utilizes a communication protocol;
   recognizing the first client certificate request by the MiTM proxy;
   transmitting, after receiving the first client certificate request from the server, from the MiTM proxy, a second client certificate request to a client;
   receiving, at the MiTM proxy, a first set of response messages generated by the client in response to the second client certificate request;
   obtaining, by the MiTM proxy a public certificate and a signed message, wherein the public certificate is mapped to the client and wherein the signed message is signed with a private key associated with the client;
   generating, at the MiTM proxy, a second set of response messages configured to be sent to the server on behalf of the client in response to the first client certificate request message, the second set of response messages containing the public certificate and the signed message, the public certificate being managed by a third party system; and
   sending, from the MiTM proxy to the server, the second set of response messages configured to authenticate the client to the server through the MiTM proxy.

2. The method of claim 1, wherein the communication protocol includes a secure socket layer/transport layer security (SSL/TLS) protocol.

3. The method of claim 1, wherein the third party system includes a hardware security module (HSM), and wherein the method further comprises obtaining the public certificate and the private key from the HSM.

4. The method of claim 1, wherein the third party system includes a lightweight directory access protocol (LDAP) system, and wherein the method further comprises obtaining the public certificate and the private key from the LDAP system.

5. The method of claim 1, wherein the third party system includes a Windows Active Directory system, and wherein the method further comprises obtaining the public certificate and the private key from the Windows Active Directory system.

6. The method of claim 1, wherein the third party system includes a database, and wherein the method further comprises obtaining the public certificate and the private key from the database.

7. The method of claim 1, further comprising:
   requesting the public certificate mapped to the client from a hardware security module (HSM);
   adding the public certificate received from the HSM to the second set of response messages;
   requesting a hardware security module (HSM) to sign a certificate verify message for the MiTM proxy; and
   sending the second set of response messages, including the certificate verify message signed by the HSM using the private key, to the server.

8. A system comprising:
   a network communication interface;
   one or more processors coupled to the network communication interface, the processors configured to perform operations comprising:
   receiving, at a man-in-the-middle (MiTM) proxy, a first client certificate request from a server during a communication session in a communication protocol via the network communication interface;
   intercepting, at the MiTM proxy, the first client certificate request;
   forwarding, from the MiTM proxy, after receiving the first client certificate request from the server, a second client certificate request to a client;
   intercepting, at the MiTM proxy, a first set of response messages generated by the client in response to the second client certificate request;
   obtaining, by the MiTM proxy from a third party system, a public certificate mapped to the client and a private key associated with the client;
   generating, at the MiTM proxy, a second set of response messages configured to be sent to the server on behalf of the client in response to the first client certificate request message, the second set of response messages containing the public certificate mapped to the client that was obtained by the MiTM proxy, and a certificate verify message generated by the MiTM proxy and signed using the private key associated with the client; and
   sending, from the MiTM proxy to the server, the second set of response messages configured to authenticate the client to the server through the MiTM proxy.

9. The system of claim 8, wherein the communication protocol includes a secure socket layer/transport layer security (SSL/TLS) protocol.

10. The system of claim 8, wherein the third party system includes a hardware security module (HSM), and wherein the operations further include obtaining the public certificate and the private key from the HSM.

11. The system of claim 8, wherein the third party system includes a lightweight directory access protocol (LDAP) system, and wherein the operations further include obtaining the public certificate and the private key from the LDAP system.

12. The system of claim 8, wherein the third party system includes a Windows Active Directory system, and wherein the operations further include obtaining the public certificate and the private key from the Windows Active Directory system.

13. The system of claim 8, wherein the third party system includes a database, and wherein the operations further include obtaining the public certificate and the private key from the database.

14. The system of claim 8, wherein the operations further include:
   requesting the public certificate mapped to the client from a hardware security module (HSM);
   adding the public certificate received from the HSM to the second set of response messages;
   requesting a hardware security module (HSM) to provide a private key associated with the client to sign the certificate verify message by the MiTM proxy; and
   sending the second set of response messages, including the signed certificate verify message, to the server.

15. A nontransitory computer readable medium having stored thereon software instructions that, when executed by one or more processors, cause the one or more processors to perform operations including:
   receiving, at a man-in-the-middle (MiTM) proxy, a first client certificate request from a server during a communication session in a communication protocol;
   intercepting, at the MiTM proxy, the first client certificate request;
   forwarding, from the MiTM proxy, after receiving the first client certificate request from the server, a second client certificate request to a client;
   intercepting, at the MiTM proxy, a first set of response messages generated by the client in response to the second client certificate request;
   requesting, by the MiTM proxy to a third party system, a public certificate and a signed message, wherein the public certificate is mapped to the client and wherein the signed message is signed with a private key associated with the client;
   obtaining, by the MiTM proxy from the third party system, the public certificate and the signed message;
   generating, at the MiTM proxy, a second set of response messages configured to be sent to the server on behalf of the client in response to the first client certificate request message, the second set of response messages containing the public certificate mapped to the client that was obtained by the MiTM proxy and the signed message; and
   sending, from the MiTM proxy to the server, the second set of response messages configured to authenticate the client to the server through the MiTM proxy.

16. The nontransitory computer readable medium of claim 15, wherein the communication protocol includes a secure socket layer/transport layer security (SSL/TLS) protocol.

17. The nontransitory computer readable medium of claim 15, wherein the third party system includes a hardware security module (HSM), and wherein the operations further include obtaining the public certificate and the signed message from the HSM.

18. The nontransitory computer readable medium of claim 15, wherein the third party system includes a lightweight directory access protocol (LDAP) system, and wherein the operations further include obtaining the public certificate and the signed message from the LDAP system.

19. The nontransitory computer readable medium of claim 15, wherein the third party system includes a Windows Active Directory system, and wherein the operations further include obtaining the public certificate and the signed message from the Windows Active Directory system.

20. The nontransitory computer readable medium of claim 15, wherein the operations further include:
   requesting the public certificate mapped to the client from a hardware security module (HSM);
   adding the public certificate received from the HSM to the second set of response messages;
   requesting a hardware security module (HSM) to sign a certificate verify message for the MiTM proxy; and
   sending the second set of response messages, including the certificate verify message signed by the HSM, to the server.

* * * * *